United States Patent Office.

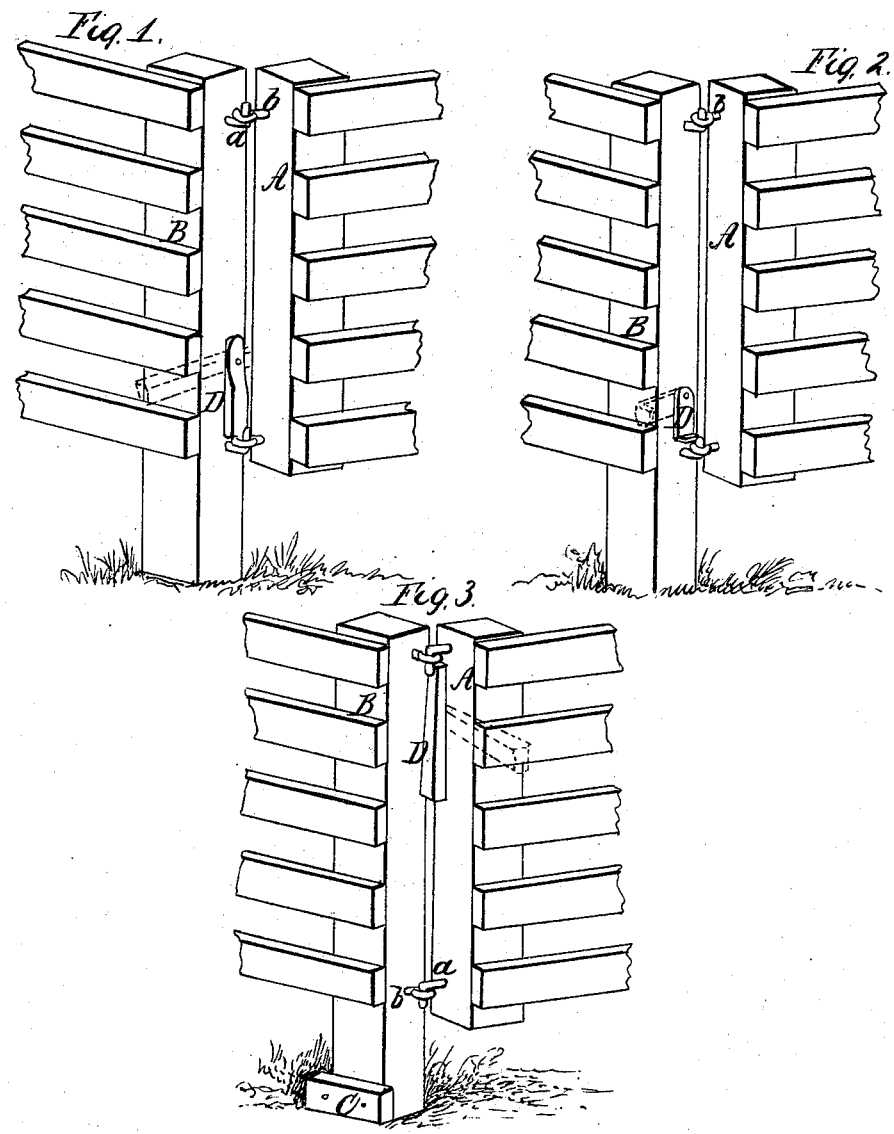

JOHN AUGSPURGER, OF TRENTON, OHIO.

Letters Patent No. 63,829, dated April 16, 1867.

---

IMPROVEMENT IN PORTABLE FENCE.

---

*The Schedule referred to in these Letters Patent and making part of the same.*

---

TO ALL WHOM IT MAY CONCERN:

Be it known that I, JOHN AUGSPURGER, of Trenton, Butler county, Ohio, have invented a new and useful Improvement in Portable Fences; and I do hereby declare the following to be a full, clear, and exact description thereof, reference being had to the accompanying drawings, making part of this specification.

My invention relates to a light, portable fence, easily moved from place to place, and quickly set up and connected where desired, at the same time that it forms a firm fence, and cannot be lifted or disconnected by swine to get under, pushed over by cattle, or easily blown down by the wind, but may be quickly and easily separated and removed by the proprietor when desirable.

Figures 1, 2, and 3, represent each a portion of two panels of my fence as set up, with different modifications of the mechanism by which the joint is secured to prevent accidental or unintentional disconnection of the panels.

I construct my fence in lengths or panels, as light as is consistent with proper strength, consisting of two posts A and B, of unequal lengths, connected by a suitable number of rails, (preferably five,) and with a diagonal or vertical brace or stay about the mid-length of each panel. One post, A, is only of sufficient length to attach the rails. The other, B, is longer, leaving a foot to slightly enter the ground as an anchor, and to raise the panel above the surface, of such length as may be necessary. The shorter post being hooked to the long one of each succeeding panel, is supported by it, and the bearings are thus brought firmly together. A cleat or block, C, (fig. 3,) may be secured to this foot to serve as an anchor to the corner, when said block is beneath the surface of the ground. The panels are connected by hooks $a$ and eyes or staples $b$, and a gravitating button, D, of wood or metal is pivoted to one of the posts in such a manner that, being swung aside to engage the hook with the staple, it returns by its own weight to the position shown in the drawings, in which it holds the eye and hook to their relative positions and prevents the lifting of the upper panel to disconnect them.

In fig. 1 this button, shown as of wood, is attached to the post B, bearing the hook, which in this case turns upward, a short distance above the lower hook. It may be revolved upon the pivot, as shown by dotted lines, to engage the hook and eye, and returns by its gravitation to a perpendicular position abutting upon the eye, and preventing it from being lifted off the hook.

Fig. 2 shows a metallic button operating in the same way as above, having at its lower extremity a flange to give it bearing upon the eye.

In fig. 3 the hooks are attached to the short post, and are turned downward to drop into the eye. The button, shown as of wood, is pivoted a short distance below the upper hook. It has one short arm, and one long and heavy, which, falling to a perpendicular position, brings the short arm to abut on the lower side of the eye, preventing the hook from being lifted out of it.

I claim herein as new, and of my invention—

The construction of a light, portable fence, in lengths or panels, having one short and one long post, substantially as shown and described, and connected and secured in a worm or zigzag form by the hooks $a$ and staples $b$, in combination with the gravitating button D, and anchor-block C, the whole operating as shown and set forth.

In testimony of which invention I hereunto set my hand.

JOHN AUGSPURGER.

Witnesses:
    GEO. H. KNIGHT,
    SAMUEL KNIGHT.